United States Patent [19]
Mokdad et al.

[11] Patent Number: 5,711,191
[45] Date of Patent: Jan. 27, 1998

[54] DAMPING FLYWHEEL NOTABLY FOR A MOTOR VEHICLE

[75] Inventors: Ayman Mokdad, Saint-Ouen; Jacques Feigler, St. Brice S/Foret, both of France

[73] Assignee: Valeo, Paris, France

[21] Appl. No.: 564,050

[22] PCT Filed: Apr. 13, 1995

[86] PCT No.: PCT/FR95/00481

§ 371 Date: Dec. 14, 1995

§ 102(e) Date: Dec. 14, 1995

[87] PCT Pub. No.: WO95/28579

PCT Pub. Date: Oct. 26, 1995

[30] Foreign Application Priority Data

Apr. 14, 1991 [FR] France .................................. 94 04436

[51] Int. Cl.[6] .................................................. F16F 15/10
[52] U.S. Cl. .................. 74/574; 74/572; 464/68; 192/205
[58] Field of Search ................. 74/572–574; 464/24, 464/68, 64, 67; 192/205

[56] References Cited

U.S. PATENT DOCUMENTS

| | | | |
|---|---|---|---|
| 1,976,505 | 10/1934 | Mallina | 74/574 X |
| 1,990,683 | 2/1935 | Wood | 192/68 |
| 3,485,063 | 12/1969 | Behlmer | 74/574 |
| 3,499,512 | 3/1970 | Maurice | . |
| 4,351,167 | 9/1982 | Hanke et al. | 192/106.2 X |
| 4,362,230 | 12/1982 | Martinez Corral | . |
| 4,638,684 | 1/1987 | Maucher | 74/574 |
| 4,856,636 | 8/1989 | Meinhard | 464/68 X |
| 4,904,226 | 2/1990 | Chasseguet et al. | 464/68 |
| 5,092,820 | 3/1992 | Naudin et al. | 464/68 |
| 5,120,276 | 6/1992 | Maucher et al. | . |

FOREIGN PATENT DOCUMENTS

| | | |
|---|---|---|
| 1921972 | 11/1970 | Germany . |
| 3926384 | 2/1991 | Germany . |
| 9427062 | 11/1994 | WIPO . |

*Primary Examiner*—Vinh T. Luong
*Attorney, Agent, or Firm*—Longacre & White

[57] ABSTRACT

The damping flywheel includes at least one cartridge (10) pivotally mounted on first and second coaxial masses. At least one elastic member (8) is mounted in the cartridge having, for mounting the elastic member (8), a web (3) and two guide components (4, 5) disposed axially on each side of the web. The web and the guide components (4, 5) have housings (82, 81) for mounting the elastic member (8). Friction means are mounted within the cartridge.

9 Claims, 13 Drawing Sheets

DAMPING FLYWHEEL NOTABLY FOR A MOTOR VEHICLE

BACKGROUND OF THE INVENTION a) Field of the Invention

The present invention concerns damping flywheels, notably for motor vehicles, of the type having two coaxial masses mounted so as to move with respect to each other, counter to an elastic damping device having at least one elastic damping member acting radially overall between the two masses, and pivotally mounted on each one thereof.

b) Description of Related Art

Such a damping flywheel, also called a double damping flywheel, is described, for example, in the document FR 93 15581, filed on 23 Dec. 1993 and not published to date.

In this document, in one embodiment, the elastic member is pivotally mounted on both masses by means of tie rods mounted in reverse orientations.

Each tie rod has a base and teeth connected to the said base. The teeth of the tie rods are each mounted inside the guide tube and define housings for mounting elastic members.

Friction is thus produced in the guide tubes during the relative movement between the two tie rods.

This arrangement proves satisfactory, but in some cases it can be desirable to increase the rigidity of the components used for mounting the elastic members, and to improve their guiding and increase friction.

SUMMARY OF THE INVENTION

The object of the present invention is to respond, in a simple and economical manner, to these requirements.

According to the invention a damping flywheel of the aforementioned type is characterised in that the said elastic member is mounted in a pivoted cartridge having, on the one hand, a web provided with a first housing for mounting the said elastic member and, on the other hand, two guide components disposed axially on each side of the said web and each having, opposite the first housing, a second housing for mounting the said elastic member, in that the guide components are fixed to each other, in that the web and the guide components are mounted in reverse orientations, the said web having at one of its internal and external peripheries a first protuberance for mounting first pivoting means on a first of the said masses, while the guide components each have at one of their external and internal peripheries a second protuberance, opposite each other for mounting second pivoting means on the second of the said masses, the said second and first protuberances being radially offset with respect to each other, and in that friction means are mounted within the cartridge for action between the web and the guide components.

By virtue of the invention, a pivoted cartridge is created which serves to house and guide the elastic members. This pivoted cartridge is more rigid than the tie rods of the prior art, notably because the guide components frame the web, while being fixed to each other.

Furthermore, the first and second housings afford good guiding of the elastic member or members.

Thus, by virtue of the invention, it is possible easily to integrate a friction device within the said cartridge, by means of the web and the guide components.

By virtue of the device according to the invention, it becomes possible, where the elastic members consist of coil springs, to mount the latter concentrically, which was impossible in the prior art.

Furthermore, the cartridge can have any number of first and second housings parallel to each other.

It proves possible to mount one or more elastic members depending on the application.

These elastic members can even act in a delayed manner, which was hardly possible in the prior art.

To this end, some elastic members can be mounted, for example, without clearance in the second housings in the guide components and with clearance in the first housing in the web.

Thus the housings in the web can be of different sizes.

Of course, the reverse is possible, some springs being mounted without clearance in the first housings and with clearance in the second housings.

All this depends on the applications.

Advantageously, the guide components are fixed laterally to each other by means of lateral edges which they have for this purpose.

Thus it is possible to fit guide shoes between the said lateral edges and the opposite section of the web.

These shoes belong to a friction device forming part of the friction means according to the invention.

Moreover, these shoes make it possible to avoid any jamming of the relative movement between the web and the guide components and increase the friction.

The friction means advantageously include a second friction device. This second device advantageously extends parallel to the elastic member and to these housings.

It advantageously has application components subject to the action of axially acting elastic washers.

The application components can rub against the web or the guide components.

They can be mounted on columns interconnecting the guide components. These columns enable the connection between the guide components to be perfected.

By means of the elastic washers, the friction can be calibrated, notably in order to adapt it to the elastic member or members, and therefore control the said friction generated by the relative movement between the web and the guide components.

Two friction devices can be mounted on each side of the elastic member and its housings.

As a variant, two elastic members can frame the friction device.

In this case, the elastic members can be mounted in a staged fashion in the aforementioned manner.

It can be seen that the arrangement according to the invention opens the way to numerous solutions.

In each case, the web and guide components are sufficiently robust and offer a wide range of contact for the friction device or devices, which can act in a delayed manner.

BRIEF DESCRIPTION OF THE DRAWINGS

The description that follows illustrates the invention in relation to the accompanying drawings in which.

DETAILED DESCRIPTION OF PREFERRED EMBODIMENTS

Figure 1:
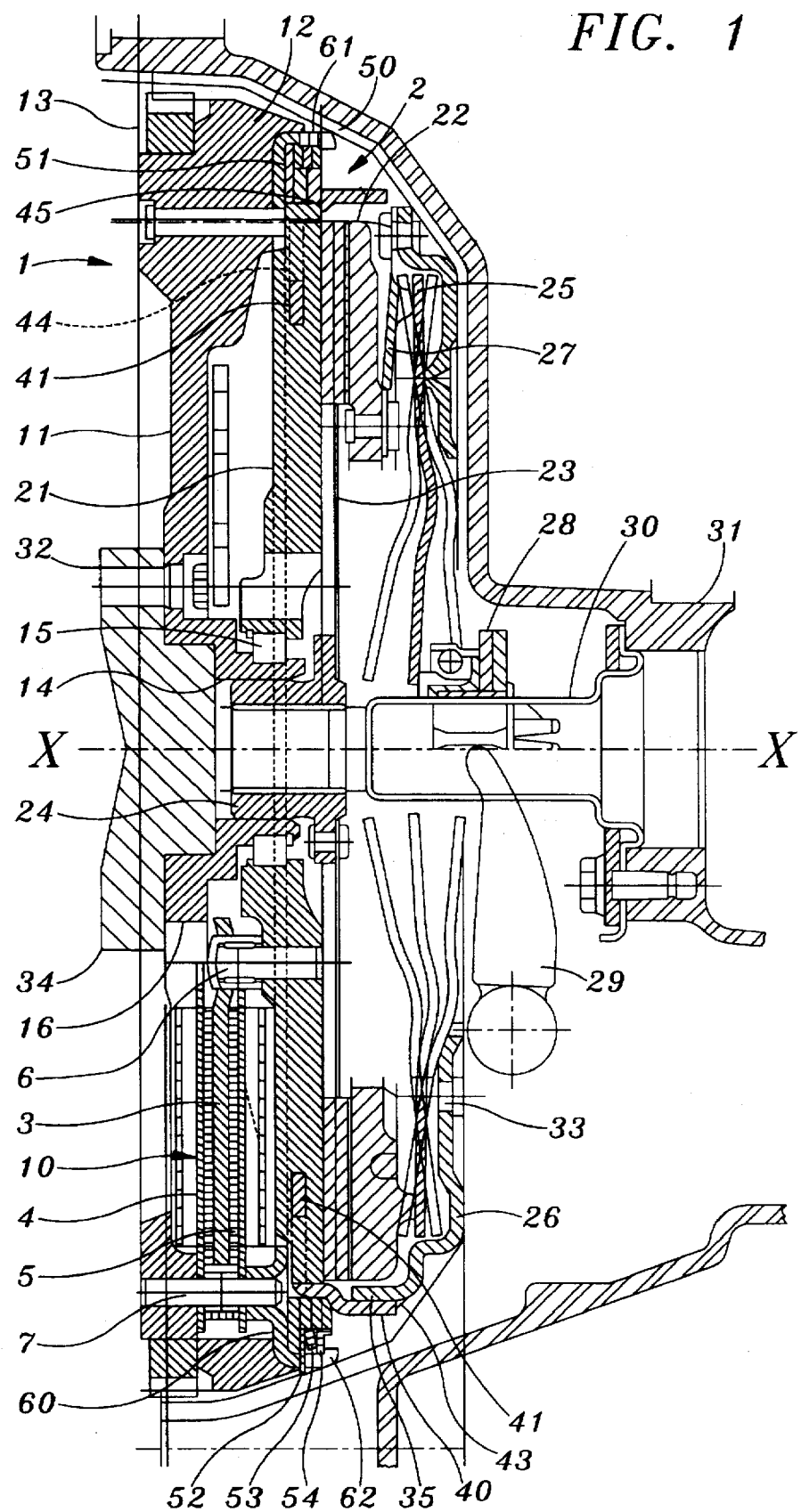
FIG. 1 is a view in axial section of a friction clutch equipped with a damping flywheel according to the invention, along the line 1—1 in FIG. 2.
Figure 2:
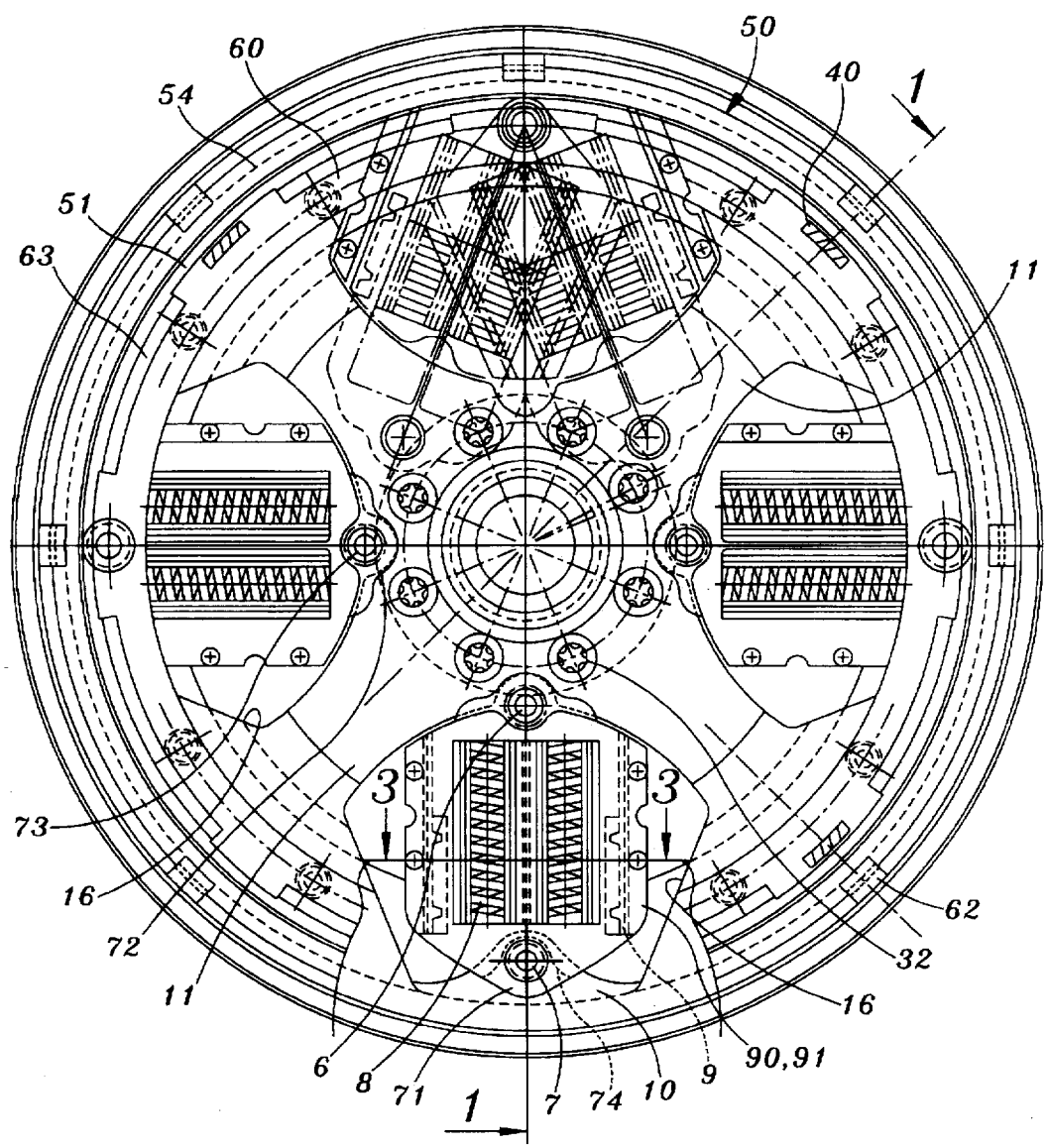
FIG. 2 is a front view of the friction clutch without its reaction and pressure plates and its friction disc, with local cut-away.
Figure 3:
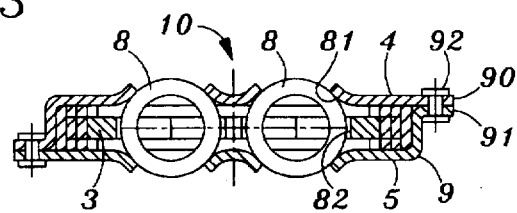
FIG. 3 is a view in cross section along the line 3—3 in FIG. 2.

In FIGS. 1 to 3, a torsion damping device is illustrated which has two coaxial pares 1, 2 mounted so as to move with respect to each other counter to elastic means 8 belonging to an elastic damping device.

This device belongs to a damping flywheel for a motor vehicle.

The first part 1 consists of a plate 11 and the second part 2 also consists of a plate 21 extending parallel to the plate 11. The plates 11 and 21 are made of a material which can be cast, commonly cast iron, to increase their inertia. As a variant, they can be aluminium based, the choice of material depending on the applications.

As a general rule, in a manner known per se, the molten metal is poured into a mould.

The two parts 1, 2 therefore consist of coaxial masses rotating with respect to each other about the axial axis of symmetry X—X of the clutch.

The second mass 2 is rotatably mounted on a tubular hub 14 carried by the first mass 11. Here, the hub 14 is of a single piece with the plate 11, and as a variant it can be attached thereto, and a bearing 15, here a ball bearing and as a variant a plain bearing, is interposed between the external periphery of the hub 14 and the internal periphery of the plate 21.

The second mass 2, rotatably mounted on the mass 1 by means of the bearing 15, constitutes the reaction plate of a friction clutch having, in a manner known per se, a pressure plate 22, a diaphragm 25 and a cover 26, here made of pressed sheet metal.

Compared to a conventional solution with an engine flywheel forming the reaction plate of the clutch, the flywheel is here divided into two parts, as explained hereinafter.

The reaction plate 21 made of a castable material has a fixing insert 40, 41 anchored in the mass of the said plate 21 by being embedded therein. The said insert 40, 41 has projecting, in the vicinity of the external periphery of the reaction plate 21, a fixing area 40 for fixing the cover 26 of the friction clutch and forming a friction device according to one characteristic of the invention.

Here the pressure plate 22, commonly made from cast iron, is rotatably connected to the cover 26 with axial mobility, in a manner known per se, by means of inclined elastic tongues 27 each fixed at one of their ends to the cover 26 and at their other end to a lug on the pressure plate 22.

Fixing is effected here by means of riveting.

The diaphragm 25 is mounted on the cover 26 so as to tilt, here by means of columns 33, one of which is visible in the bottom part of FIG. 1. This column has a head to support the diaphragm opposite a pressing formed in the bottom of the cover.

For more information, reference should be made to the document FR-A-1 524 350 (U.S. Pat. No. 3,499,512).

As a variant, it is possible to use a pivot with two rings carried by the columns or arrangements with washers carried by lugs formed from the cover by means of bending and cutting.

The diaphragm 25 bears upon the bottom of the cover 26 in order to push the pressure plate 22 in the direction of the reaction plate 21. The friction clutch also has a friction disc 23, which is connected to a central hub 24 fixed with respect to rotation on the input shaft of the gearbox (not shown) by a fluted mounting.

For the record, it should be stated that the set of components 26, 25, 24, 27 forms a unitary clutch mechanism fixed by its cover 26, hollow in shape, to the reaction plate 21 by means of the inserts 40, 41 according to the invention.

Normally, the friction linings, which the disc 23 has on its external periphery, are clamped under the action of the diaphragm between the plates 21, 22 so that the clutch is normally engaged.

In order to declutch, the clutch here being of the pushed type, it is necessary to act by pushing the ends of the fingers of the diaphragm 25 by means of a clutch release bearing 28 to disengage the clutch.

To this end, the release bearing 28 is mounted axially along a guide tube 30 fixed to the gearbox 31 and through which passes the input shaft thereof.

This release bearing 28 is controlled by a clutch fork 29 enabling it to move axially towards the left of FIG. 1, thereby leading to a tilting of the diaphragm, several positions of which are depicted in FIG. 1.

The first rotating mass 11 is designed to be connected, here by screws 32, by its internal periphery to a driving shaft, in this case to the crankshaft 34 of the internal combustion engine of the motor vehicle, while the second rotating mass 2 is rotatably connected by means of the clutch mechanism 22, 25, 26, 27 and disc 23 to a driven shaft, here the input shaft of the gearbox of the vehicle.

The first mass 1, forming a plate, essentially consists of a central part 11, transversely oriented, in the form of a plate or flange, which is extended of a single piece on its external periphery by an axially oriented cylindrical skirt 12.

This mass 1 carries on its external periphery a starter ring gear 13 designed to be driven by the pinion of a starter (not shown).

The internal part of the mass 1 is provided with a plurality of holes for the passage of the screws 32 fixing the mass 1 to the crankshaft 34.

It will be noted that the reaction plate 21 has corresponding holes permitting the passage of a tool for tightening the screws 32 and that the bearing 15 extends beneath the screws 32 and the said holes, being of reduced size.

Here the insert 40, 41 is metallic, being made of pressed sheet metal.

This insert has a transverse part 41 embedded and therefore firmly seated in the main transverse part of the reaction plate 21.

This part 41 is provided with a plurality of holes 44 to perfect the seating.

At its external periphery, this transverse part 41 is extended, in the direction of the bottom of the cover 26, by an axially oriented cylindrical part 40, optionally divided into lugs, which forms the fixing area. The part 40 extends so as to project axially with respect to the friction face of the reaction plate, extending radially beyond the external periphery of the plate 21 (in the vicinity thereof) and therefore at a distance from the friction linings of the disc 23 and of the pressure plate 22 that they surround. The friction face, which the plate 21 offers to the disc friction linings 23, can therefore extend as far as the external section of the plate 21. The cover 26 has on its external periphery an axially oriented rim 35, here divided.

This rim is cylindrical and is suitable for cooperating slidingly (in a telescopic manner) with the internal periphery of the part 40 forming a centring device.

The rim 35 is thus interposed between the part 40 and the external periphery of the pressure plate 22.

It is therefore possible to engage the cover 26 in the part 40 to a greater or lesser extent.

Of course, it is possible to reverse the structures, the rim then surrounding the part 40, cooperating with the external periphery thereof. In any case, the part 40 forms a guiding and centring device for the rim 35, in close contact with the part 40, and therefore for the cover 26.

It is thus possible to control, in a precise manner, the inclination and/or loading of the diaphragm 25', and this with respect to a reference, in this case the crankshaft 34 of the engine of the vehicle.

Once the diaphragm has attained the desired inclination or loading, the cover is then fixed, in this case to the free end of the fixing area 40 of the insert, here by welding, with formation of a bead 43.

When the rim 35 surrounds the part 40, the welding is carried out on the free end of the rim.

In the figures illustrated, the elastic means of the elastic damping device have at least one elastic member 8 and act radially overall between the plates 11 and 21 and therefore between the two masses 1, 2.

According to one embodiment of the invention, elastic members are mounted in at least one pivoting cartridge 10 (FIGS. 2 and 3) having, on the one hand, a web 3 provided with first housings 82 for mounting the elastic members 8 and, on the other hand, two guide components 4, 5 disposed on each side of the said web and each having, opposite the first housing 82, a second housing 81 for mounting the said elastic members 8, here consisting of two coil springs, optionally mounted in pairs in the housings 81, 82.

Furthermore, friction means, described hereinafter, are mounted within the pivoted cartridge 10, for action between the web 3 and guide components 4, 5.

These friction means include at least one friction device.

One of the friction devices has at least one axially acting elastic washer, as described hereinafter. In FIGS. 1 to 11, two mutually parallel housings 82 are provided. The damping flywheel thus has at least two elastic members 8 mounted parallel to each other in the cartridge, the said web 3 having two first parallel housings 82, while the guide components 4, 5 have, opposite each of the first housings, a pair of second parallel housings 81. Of course, it is possible to provide a single spring per cartridge, and therefore a single pair of housings 81 and a single associated housing 82.

As a variant, it is possible to provide a larger number of housings 81, 82 and therefore of springs 8 per cartridge, all this depending on the application.

The guide components 4, 5 are fixed laterally with respect to each other. The web 3 and guide components 4, 5 are mounted in reverse orientations, the said web having, according to the invention, at one of its external and internal peripheries, a first protuberance 72 for mounting first pivoting means 6 on a first of the said masses 11, 12, while the guide components 4, 5 have at one of their external and internal peripheries a second protuberance 71, opposite each other, for mounting second pivoting means 7, on the other one of the said masses.

The said second 71 and first protuberances 72 are radially offset with respect to each other, and the same is therefore true of the pivoting means 6, 7.

Here, the first 82 and second housings 81 consist of radially oriented apertures, the second housings 81 having lips.

As a variant, the first housing can consist of a radially oriented cutout open radially on the side opposite the first protuberance.

As a variant, the second housings 81 can consist of pressings. Advantageously, the first housings are closed.

In any case, the guide components 4, 5 have laterally on their external periphery rims 90, 91 for their mutual fixing, here using rivets 92.

These rims have parts perpendicular to the web 3 and parallel thereto. The rims 90, 91 are therefore in contact with each other.

These guide components 4, 5 are therefore fixed laterally to each other by means of riveting.

As a variant, they can be fixed to each other by their rims by means of welding (FIGS. 9 to 11) or clamping. All combinations are possible, for example the guide components are fixed to each other laterally by means of riveting and welding.

Here, two springs 8 are mounted parallel to each other inside the said cartridge and the web 3 is pivotally mounted at its internal periphery on the plate 21, while the guide components 4, 5 are pivotally mounted at their external periphery on the plate 11. The components 4, 5 each have in the first protuberance 72 a recess 73, here semi-circular, for the passage of a shaft 6, described hereinafter, which enables the springs 8 to be extended.

The same is true of the web 3, which has in the second protuberances 71 a recess 74, here semi-circular, for the passage of a shaft 7 described hereinafter.

The springs 8 are therefore of maximum length.

More precisely, the web 3 is pivotally mounted by the first pivoting means 6 on the plate 21 (on the internal periphery thereof) by means of a shaft 6 with a shouldered head fixed, in this case as a push fit, on the plate 21 and surrounded by a needle bearing 171 interposed between the said shaft and a socket (or sleeve) 170 fixed on the web 3.

As a variant, a plain bearing can be used.

This socket 170 extends axially between the plates 11 and 21, while being fixed in this case by welding to the web 3.

At their external periphery, the components 4, 5 are pivotally mounted on the plate 11 by the second pivoting means 7 by means of a shaft 7 which is a push fit in the plate 11 and in a component 60, and this on the external periphery of the plate 21.

The axis 7, like the axis 6, is surrounded by a needle bearing interposed between the said shaft and a sleeve fixed to the guide components 3, 4, in this case by welding.

The sleeve and the needle bearing are interposed axially between the plate 11 and the component 60 having a well to receive the shaft 7.

Figure 14:
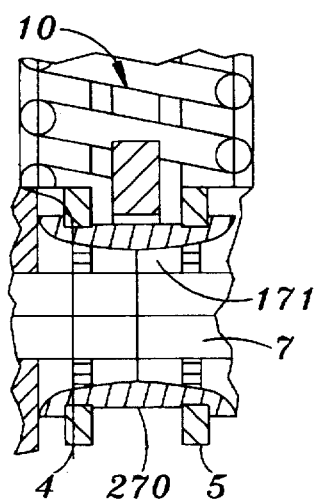
FIG. 14 is a partial view for yet another variant of the pivoting means.

As a variant (FIG. 14) the sleeve 270 can be fixed by means of crimping to the components 4, 5. To this end, the sleeve has a central part of greater diameter extending between the two components 4, 5 and offering the latter a shoulder. The ends of the sleeve are folded over to fix it by means of crimping to the components 4, 5. This sleeve 270 is mounted on the needle bearing 171.

The plate 11 is recessed at 16 opposite each cartridge 10. The recesses 16 assist the ventilation of the damping flywheel, and the reduction of the axial size.

Here, the elastic damping device has four pivoted cartridges 10, and four shafts 6, 7, evenly distributed, are provided as illustrated in FIG. 2. Of course, this number depends on the applications.

The component 60, whose transverse part is transversely oriented, is fixed here by means of riveting to the external periphery of the plate 11, more precisely to the part 12 thereof. This component 60 is transversely oriented.

This component 60, here made of sheet metal, therefore makes it possible to stiffen the plate 11 with the openings 16 in it. For the sake of convenience, it will be referred to as the stiffening component.

The component 60 also makes it possible to define a clevis for mounting the shafts 4.

The component 60 has on its external periphery, in a first embodiment, an axially oriented rim with cutouts 61 forming mortices and lugs 62 at its free end. The lugs 62 are radially folded over towards the axis of the assembly.

The component 60 lies close to the first mass and therefore is in the shape of a comb before the lugs 62 are folded.

Between the external periphery of the transverse part of the component 60 and the lugs 62, there are found successively axially a friction washer 51, an application washer 52, an axially-acting elastic washer 53, in this case a Belleville washer, or as a variant a diaphragm or a wave washer, and finally a bearing component 54 in contact with the lugs 62.

The application ring 52 has at its external periphery lugs, forming tenons, engaged in cutouts 61 in the component 60.

The washer 52 is thus rotatably connected, optionally with clearance, to the component 60 by means of a connection of the tenon and mortice type.

The component 51 is made from a friction material, advantageously from a mouldable material such as plastic, and in cross section is in the shape of an inverted L overall.

Locally on its internal periphery the component 51 has projections 63 engaged, with or without circumferential clearance, in local pressings 45 formed in the area connecting the fixing area 40 to the seating area 41 of the fixing insert 40, 41.

The pressings 45 are directed towards the axis of the assembly while being in contact With the external periphery of the reaction plate 2. For this reason, the projections 63 are bevelled.

Thus, by means of the component 60 and the fixing insert 40, 41, a hysteresis device 50 is created which acts between the components 40, 41–60, the said device comprising, on the one hand, the washers 52, 53, 54 fixed with respect to rotation by means of the component 52 on the component 60 and, on the other hand, the friction component 51 fixed with respect to rotation, optionally with clearance, to the component 40 and therefore to the plate 21. The device 50 therefore forms friction means acting between the two masses 1, 2 by means of the component 60 and the reaction plate 21.

This device acts on the external periphery of the two masses 1, 2, leaving intact the axial space between the two plates 11 and 21. It is thus possible to use a bearing 15 of reduced size and to tighten the screws 32.

During the relative movement between the two masses 1, 2, the springs 8, and therefore the pivoted cartridges 10, are inclined as depicted in the top part of FIG. 2, with a relative movement between the components 51 and 60 generating friction. The springs 8 are compressed during this movement and therefore operate in compression.

As is more readily visible in FIG. 3, the reaction plate 21 is of reduced thickness on its external periphery in order to house the component 60. Its front face, facing the plate 11, is therefore trimmed away.

The external periphery of the component 60 and the washers 51, 52, 53, 54 extend in the thickness of the plate 61.

The two concentric masses 1, 2 are therefore mounted so as to move with respect to each other, counter to elastic means 8 with radial action overall and friction means 50 with axial action.

During the declutching operation, the washer 53 acts counter to the declutching force and thereby takes pressure off the bearing.

It will also be noted that two guide shoes 9 act between the lateral edges of the web 3 and the lateral edges of the guide components 4, 5.

These shoes 9 have projections engaged in cutouts in the lateral edges of the web 3. The shoes 9 fit on the edge of the web 3.

Thus additional friction arises during the relative movement between the two masses 1, 2, the shoes guiding the web 3 during its movement relative to the components 4, 5. Any risk of jamming is thereby avoided.

The shoes 9 therefore form part of a friction device acting between the web 3 and the guide components 4, 5.

This friction device forms part of the friction means according to the invention.

Of course, the shoes 9 are shorter radially than the guide components. This operates in the manner of a slide.

It will be noted that the insert 40, 41 therefore has a seating area 41, transversely oriented, embedded in the plate 21, and a fixing area 40, axially oriented, enabling a friction device to be created and fixing of the cover 26 to be obtained, in this case so as to be adjustable.

By virtue of the insert 41 and its area 40 the size of the damping flywheel is reduced at this point, thereby enabling the friction device 50 to be fitted without interference with the casing of the clutch.

In these FIGS. 1 to 4, the stiffening component 60 carries at its external periphery the washers 51, 52, 53, 54 of the friction device 50 fitted radially between its axially oriented external peripheral rim and the edge of the external periphery of the reaction plate 21. This device extends radially above the fixing face of the reaction plate 21 for the friction linings of the friction disc 23.

The structures can of course be reversed.

Figure 5:
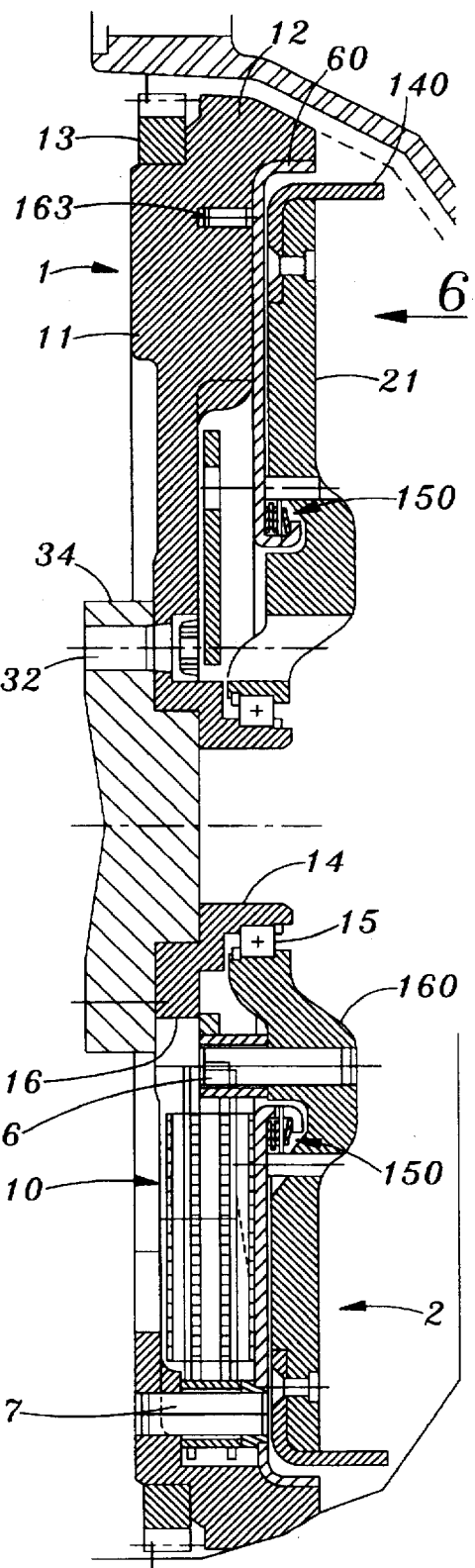
FIG. 5 is a view similar to FIG. 1 for a second example embodiment.

Thus in FIG. 5 the friction device 150 is fitted at the internal periphery of the stiffening component 60, fixed here by screws 163 on the skirt 12 of the plate 11.

To this end, the plate 21 has at its internal periphery a protuberance 160 directed axially in the opposite direction to the plate 11.

The pivoting means 6 are mounted by means of this protuberance 160.

These pivoting means, as before, a sleeve fixed by means of welding to the web 3, extending in an axial direction towards the protuberance 160.

By means of this protuberance, it is possible to lengthen the sleeve.

In this case, a plain bearing is interposed between the sleeve and the pivoting axis proper.

The stiffening component 60 has on its external periphery an axially oriented rim following the shape of the skirt 12.

Figure 7:
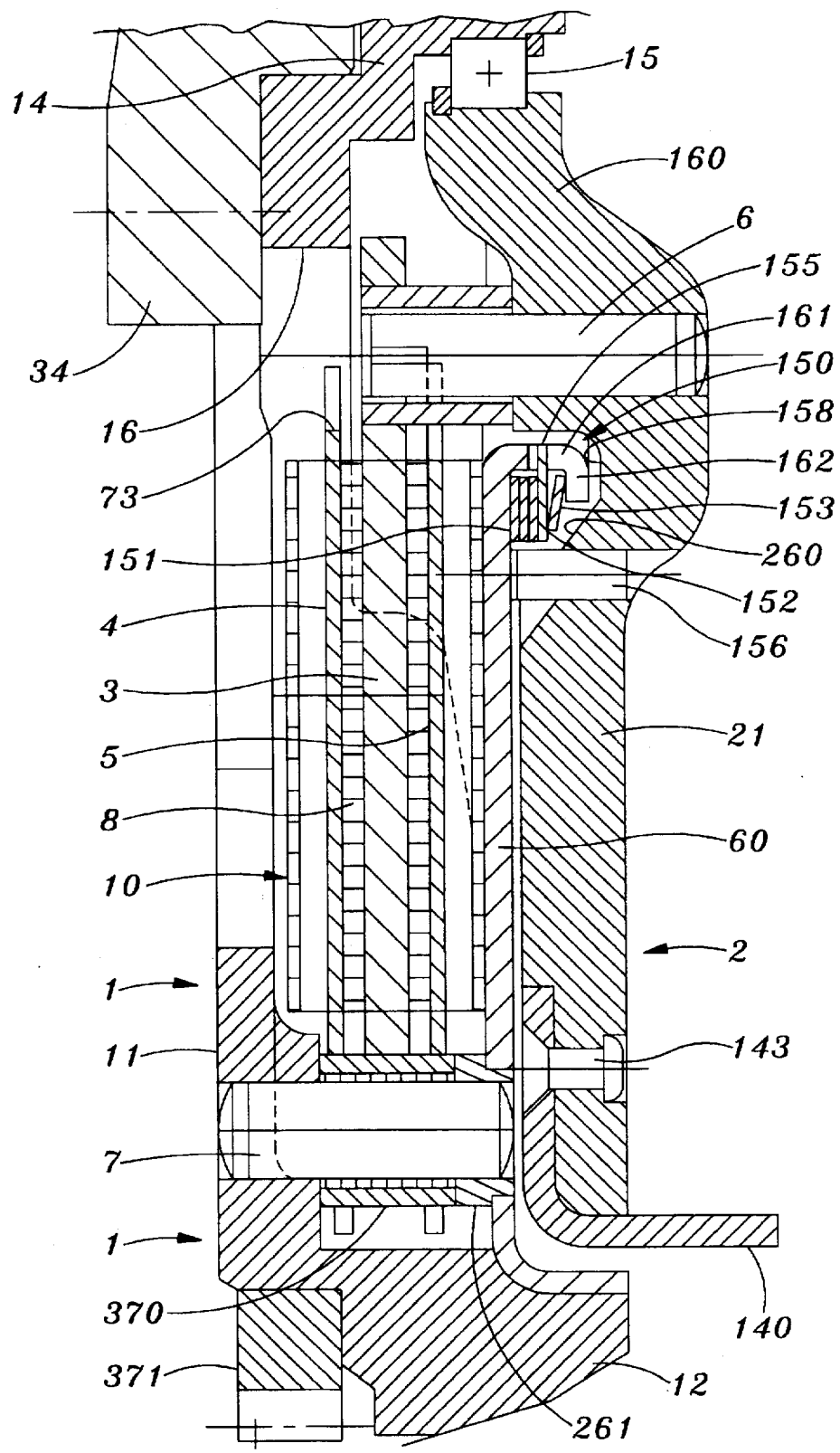
FIG. 7 is a view to a larger scale of the bottom part of FIG. 5.

In FIGS. 3 and 7, it will be noted that the component 60 is fixed to the external face of the skirt 12, facing in the opposite direction to the plate 11, and that the component 60 follows the said face of the skirt, which as a variant can be attached to the plate 11, the rivets in FIG. 1 then serving to connect the said skirt and the said component 60 to the plate 11.

On its internal periphery, this component 60 (FIG. 7) has an axially oriented rim directed in the opposite direction to the plate 11.

This rim has cutouts 161 forming mortices and, at its free end, lugs 162, initially in line with this rim.

These lugs are designed to be folded here radially in a direction opposite to the axis of the assembly.

To this end, as can be seen faintly in FIG. 7, incisions are provided to facilitate the folding of the lugs 162. The same is true of FIG. 3.

Between the internal periphery of the transverse part of the component 60 and the lugs 162, there are found successively axially a friction disc 151, an application washer 152 and an axially-acting elastic washer 153, in this case a Belleville washer, bearing directly upon the lugs 162 to act on the application washer 152 and to clamp, as in FIG. 3, the friction washer 151 between the application washer 152 and the component 60.

This application component 152 has at its internal periphery lugs 155 forming tenons engaged, optionally with circumferential clearance, in the mortices 161.

At its external periphery the washer 151 has cutouts 157 suitable for meshing, in this case with clearance, with studs 156 carried by the reaction plate 21.

As a variant the cutouts mesh with the studs 156 without clearance.

These studs extend radially below the friction face of the reaction plate 21 for the friction linings of the friction disc 23 of the reaction plate 21 having at its external periphery an annular fixing component 140 with a square-shaped cross section fixed by rivets 143 to the reaction plate 21.

Figure 15:
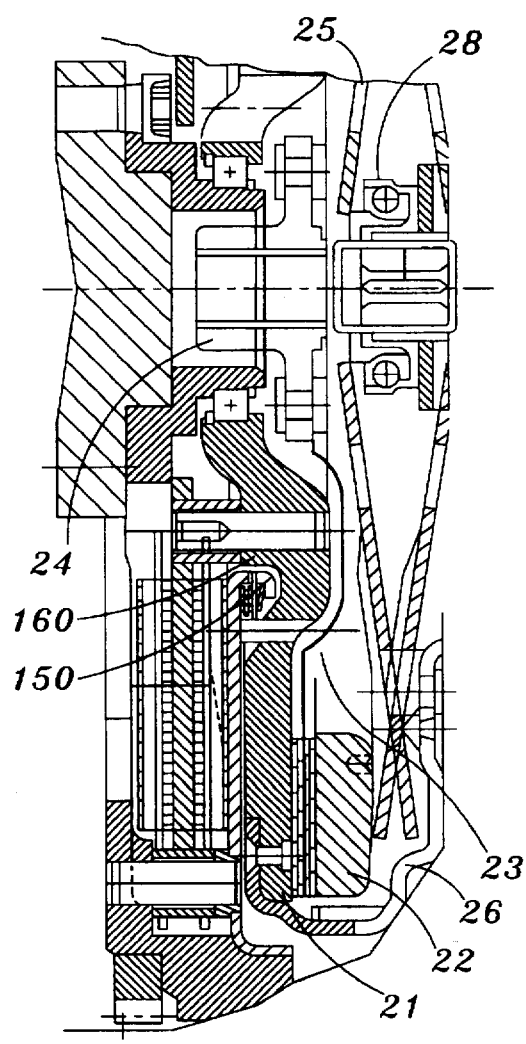
FIG. 15 is a half-view similar to FIG. 5 with the remainder of the clutch.
Figure 6:
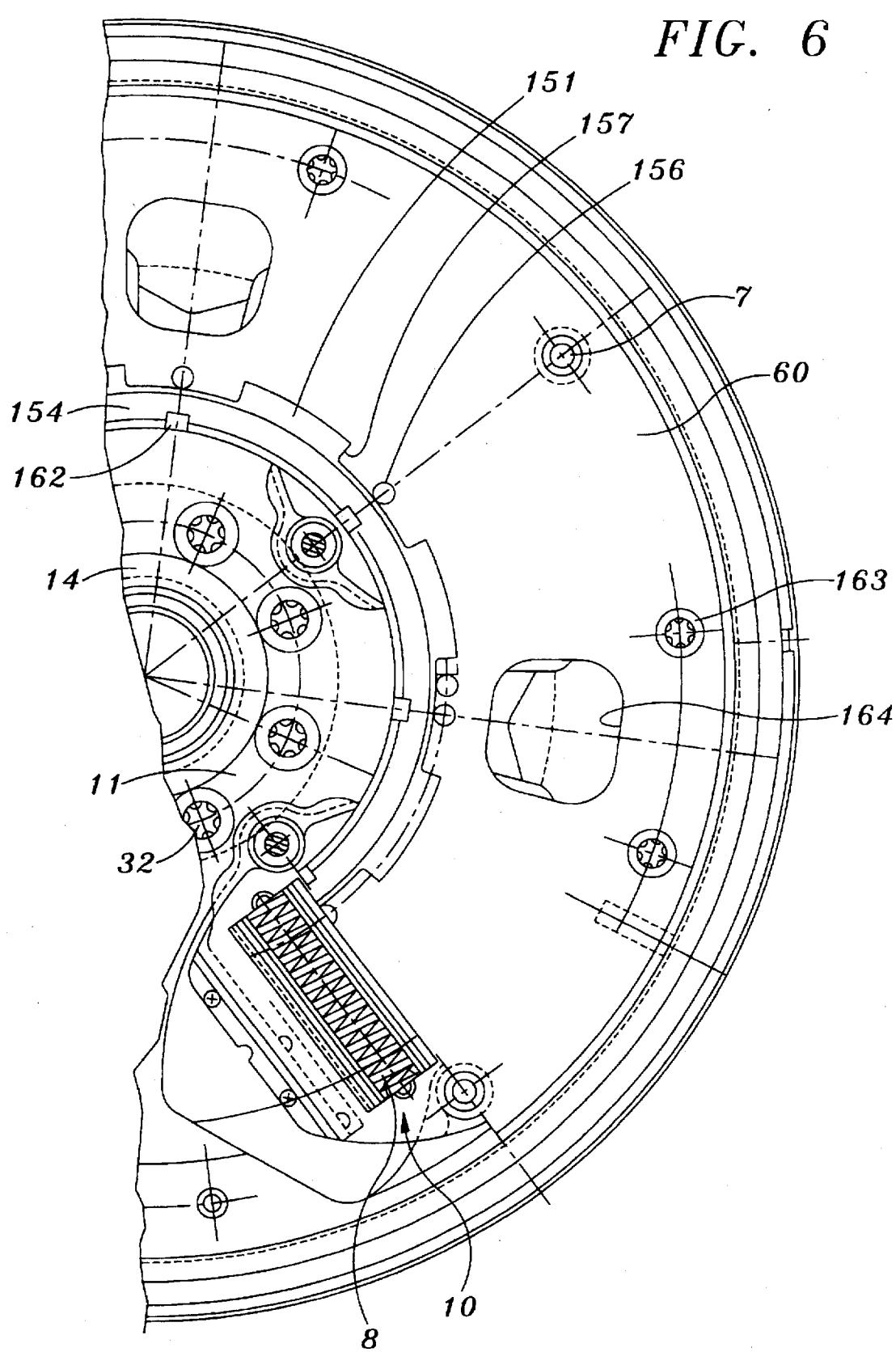
FIG. 6 is a partial view in the direction of the arrow 6 in FIG. 5, the reaction plate 21 having been removed.

For this purpose the face of the reaction plate 21, turned towards the plate 11, is hollowed out for housing the transverse part of the component 140, the axial part 140 of which serves for fixing the cover in FIG. 1, the remainder of the clutch not having been depicted for reasons of simplicity. It will nevertheless be noted that the disc 23 is curved to follow the shape of the protuberance and pass round it, as visible in FIG. 15, in which the clutch can be seen.

The hysteresis device 150 therefore extends radially below the friction face (FIG. 15) and for this purpose the reaction plate 121 is hollowed out at 158, 260 to house the washers 151, 152, 153 and the lugs 162.

In this way an annular recess is created with a bottom 158 extending transversely overall and an inclined edge 260 directed towards the plate 11.

Internally the recess housing the friction device 150 is delimited by an axially oriented rim. This recess or hollow is formed by means of the protuberance 160 on the face of the plate 21 directed towards the plate 11.

The stiffening component 60 enables the screws 32 to be tightened and has openings 164 (FIG. 6) to facilitate ventilation.

It will be appreciated that, compared with the embodiment in FIG. 1, the radial size of the reaction plate 21, and therefore the inertia, cab be increased.

The pivoting means 7 comprise a shaft fitted into the plate 11 and into a socket 261 attached by welding to the component 60.

These pivoting means also include a sleeve 370 forming a brace between the socket 261 and the plate 11, this sleeve 370 is mounted in corresponding openings provided in the guide components 4 and 5.

A plane bearing 371 is interposed radially between the sleeve 370 fixed to the components 4 and 5.

In both cases, the component 60, of transverse orientation overall, extends in the vicinity of the plate 21 and has a dual function, namely on the one hand a friction function for the device 50, 150 and on the other hand a supporting function for the pivoting means 7 fitted in both cases at the external periphery of the said component 60. In both cases it stiffens the mass 1.

Figure 9:
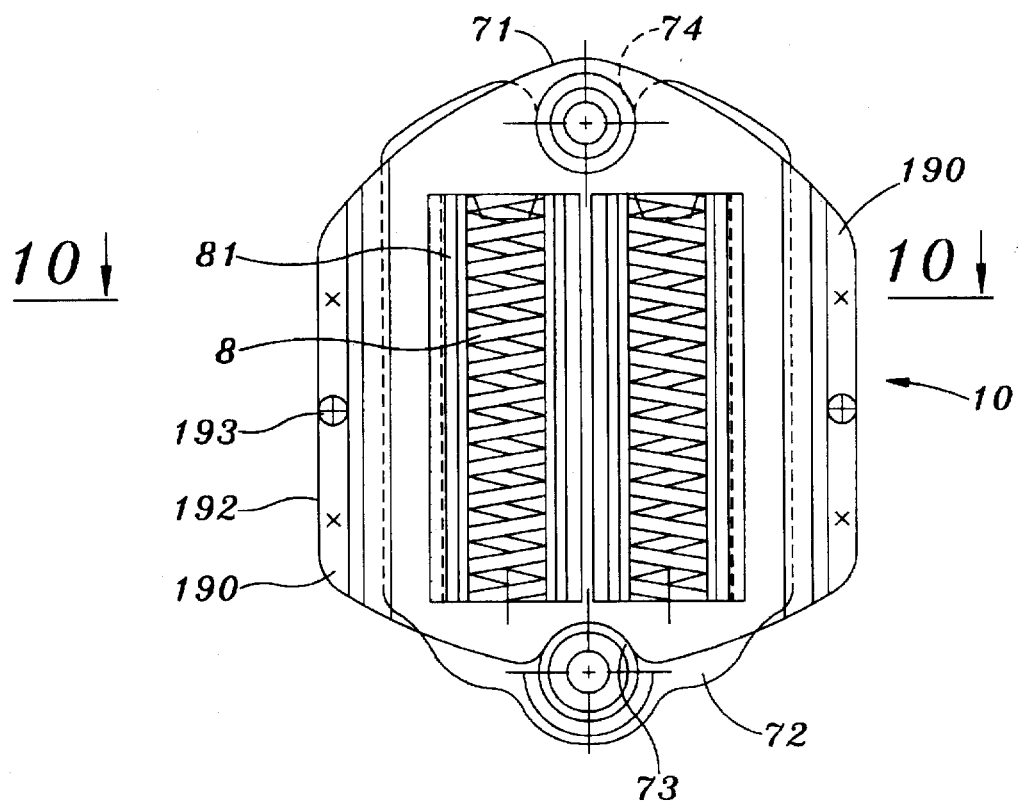
FIG. 9 is a front view of a pivoted cartridge for another example embodiment.
Figure 10:
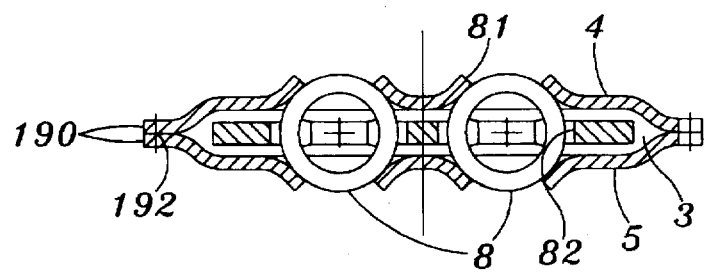
FIG. 10 is a view in cross section along the line 10—10 in FIG. 9.

In FIGS. 9 and 10, the guide components 4 and 5 have identical lateral edges 190 fitted together and fixed by welding, by points marked at 192, centring studs 193 acting between the two rims 190.

Figure 11:
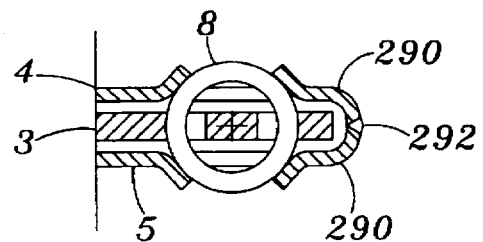
FIG. 11 is a half-view in cross section similar to FIG. 10 for another example embodiment.

Naturally these fitted-together rims can be semicircular in shape, as can be seen in FIG. 11 at 290, whilst being welded as can be seen at 292.

Figure 12:
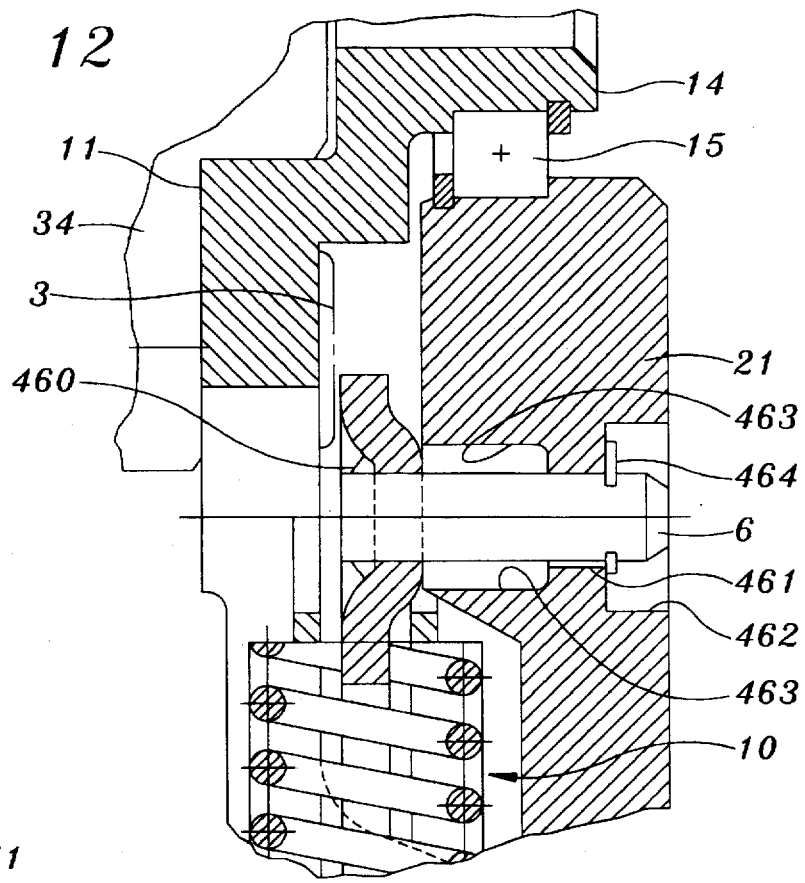
FIG. 12 is a view in partial cross section for another variant of the pivoting means.

The first pivoting means can include (FIG. 12) a shaft 6 welded at 460 to the web 3 and pivotally mounted on the plate 21 by means of a transverse wall 461 formed in the thickness of the plate 21 by means of communicating passages 462, 463 provided in the said plate 21.

The shaft 6 is therefore mounted journalled in the bore of the wall 461.

A split washer of the circlip type 464 is mounted in the passage 462 in a groove in the shaft 6 for axial locking of the said shaft.

Figure 13:
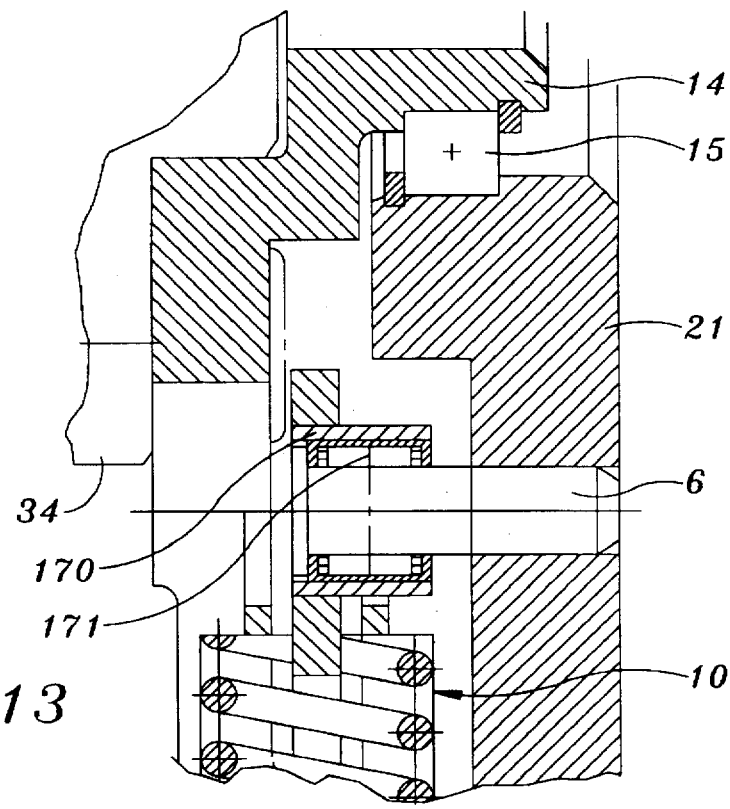
FIG. 13 is a view similar to FIG. 12 for yet another example embodiment.

Naturally (FIG. 13) the web 3 may not be deformed at its internal periphery in order to carry the sleeve 170 surrounding the needle bearing 171.

Naturally the clutch may be of the drawn type as described in the document FR-A-2 463 874 (U.S. Pat. No. 4,362,230).

The cover may be made from plastic reinforced with fibres, for example glass fibres.

Figure 4:
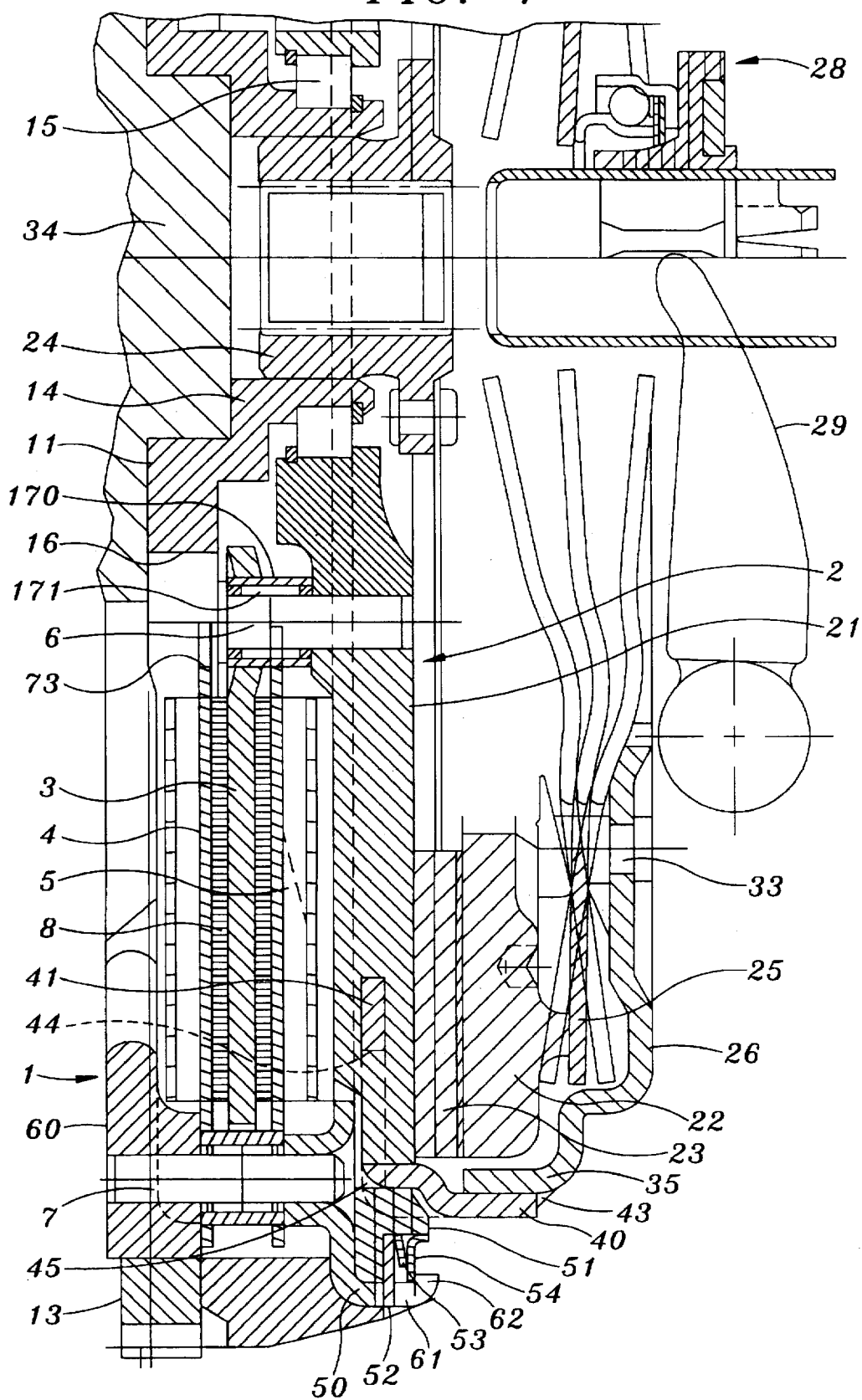
FIG. 4 is a view to a larger scale of the bottom part of FIG. 1.

As a variant the columns 33 and the diaphragm 25 can be mounted outside the cover, as in FIG. 4 of the document FR-A-1 524 350 (U.S. Pat. No. 4,362,230).

In this case the protrusions offered by the pressure plate 22 for supporting the diaphragm 25 pass through the cover fixed for example as in FIG. 7 by welding to the insert.

It will be appreciated that the bearing 15 is of reduced size and that it extends below the screws 32, which makes it possible to extend the springs 8 and therefore the cartridges 10.

In the illustrated figures, for the idle position of the damping flywheel, the cartridges 10 extend radially, the pivoting means 6, 7 then being aligned on the same axis, being offset radially.

As a variant for the said idle position, the cartridges 10 can be slightly inclined, the pivoting means 6, 7 then being offset circumferentially and radially.

Figure 8:
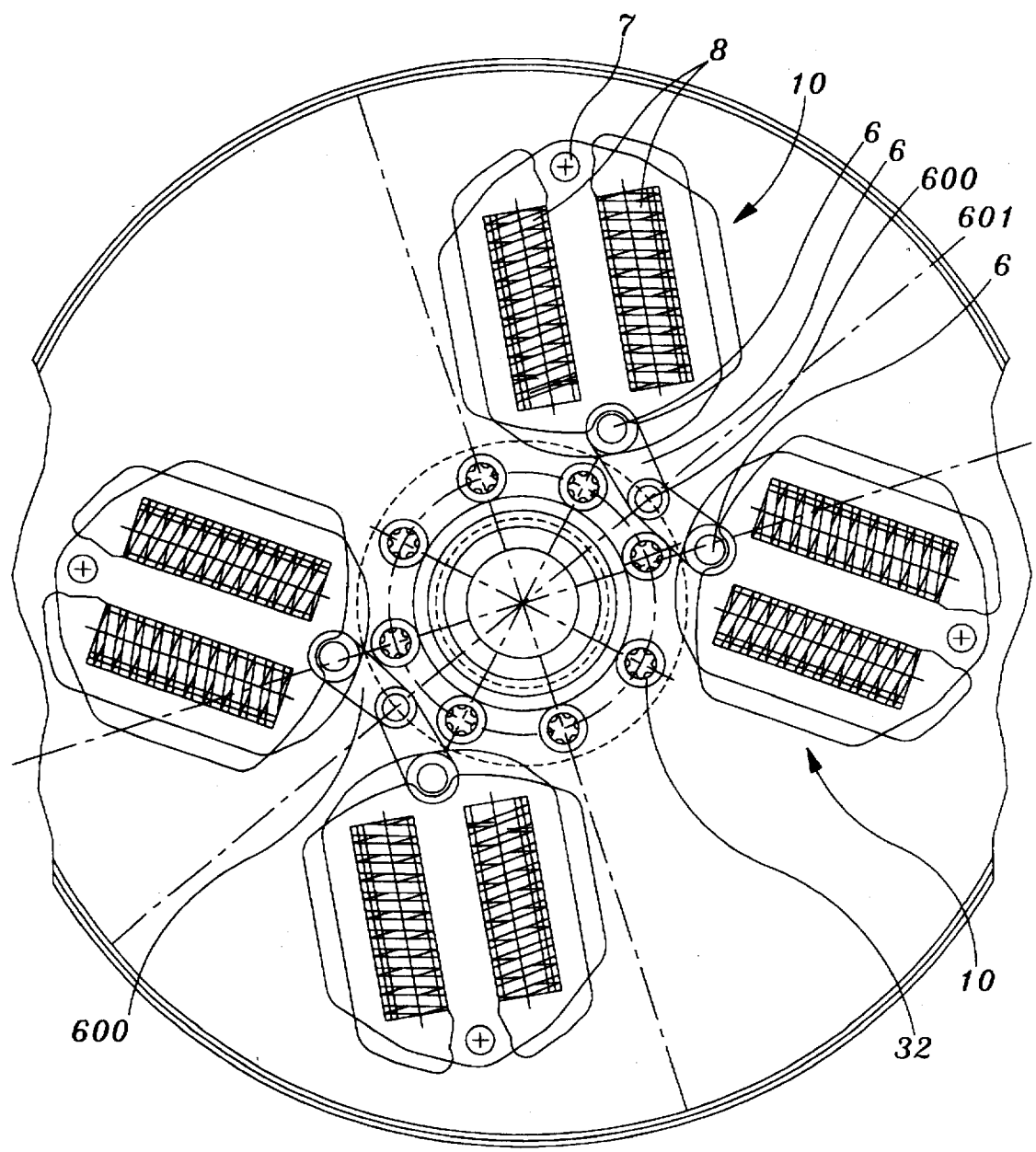
FIG. 8 is a view in axial section for a third example embodiment.

Thus in FIG. 8 the cartridges 10 are grouped in pairs, the guide components being pivoted at their external periphery on the pivoting means 7 carried by the first mass.

At their internal periphery the two webs are pivoted on a link 600 by means of pivoting means 6. The link 600 is thus pivoted at each of its end on one of the webs and centrally on pivoting means 601 pivoted on the reaction plate 21 in the same way as in FIGS. 1 to 7.

When there is relative movement between the web 3 and the guide components 4, 5, the springs are therefore allowed to operate in traction/compression.

In all cases, these springs act radially overall between the two masses.

As a variant the link 600 can be fixed directly, for example by welding, to the two associated webs 3.

Naturally the structures can be reversed, the components 4, 5 being pivoted at their internal periphery on the reaction plate 21, whilst the web 3 is then pivoted at its external periphery on the plate 11 with action of the component 60.

The bearing 15 can be interposed radially between an axially oriented rim which the plate 21 then has at its internal periphery and the hub 14. Thus the outer ring of the bearing 15 is in contact with the hub 14, whilst the inner ring of the bearing 15 is in contact with the plate 21.

The closed holes 44 can be replaced by pressings or hollows, or lugs, preferably in alternation.

For example, in FIG. 1, the seating part 41 would then advantageously have a first series of pressings directed towards the plate 11, and a second series of pressings directed axially towards the plate 22. Naturally holes can also be provided.

The holes may be replaced by open recesses affecting the edges of the insert.

In all cases, the insert has deformations, either opening out (the holes, recesses, hollows, lugs) or not opening out (the pressings), or both at the same time for better anchoring in the mass of the reaction plate.

As will have been understood, the openings 16 make it possible to avoid any interference between the cartridges 10 and plate 11.

These openings 16 are therefore relief openings enabling the axial size of the damping flywheel to be reduced.

It is for this reason that the openings 16 have a circular bottom edge and the same applies to the shape of the bottom edge of the guide components 4, 5 (FIG. 2).

Thus, during relative movement between the web 3 and the guide components 4, 5, no interference is to be feared.

The protuberances 71 have a pointed shape, the plate 11 having at this point a boss for mounting pivoting means 7.

As will have been understood, in the illustrated figures, the reaction plate 21 carries components 40 (FIG. 1), 140 (FIG. 5) enabling the clutch cover to be fixed axially at a distance from the reaction plate, the said components having a part extending axially for this purpose.

Thus, unlike the arrangement described in the document FR-A-2 565 360 (U.S. Pat. No. 5,120,276), the clutch cover does not have a radial rim for fixing it directly to the reaction plate.

Thus it is possible to fit the friction means at the external periphery of the reaction plate within a given space (FIG. 1) or to increase the height of the reaction plate (FIG. 5), whilst in all cases having a friction face for the reaction plate of maximum diameter, the said face being able to extend as far as the external peripheral edge of the reaction plate 21.

Naturally the components 40, 140 may have at their free end a rim directed towards the axis of the assembly or in the opposite direction to the axis of the assembly for fixing the cover, which may have a peripheral fixing rim as in the document FR-A-2 565 650, the said cover then being flatter.

This cover can be simplified and consist of a plate attached by welding to the components 40, 140.

As a variant the fixing of the cover can be achieved by crimping or clamping to the free end of the components 40, 140.

Naturally in FIG. 1 the component 40 can be fixed as in FIG. 5 to the reaction plate 21.

As a variant, as mentioned previously, it is possible to mount the springs in pairs.

Figure 16:
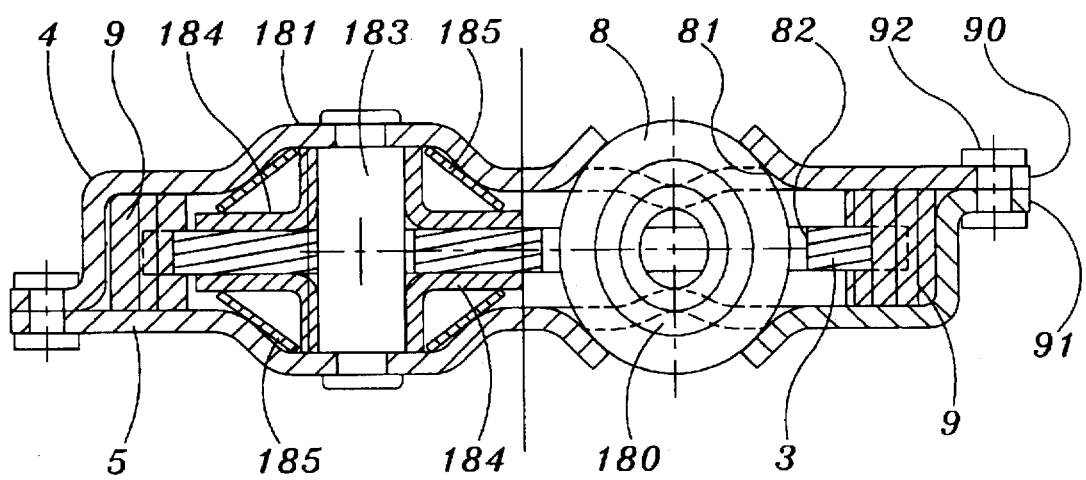
FIG. 16 is a view similar to FIG. 3 for another example embodiment.
Figure 19:
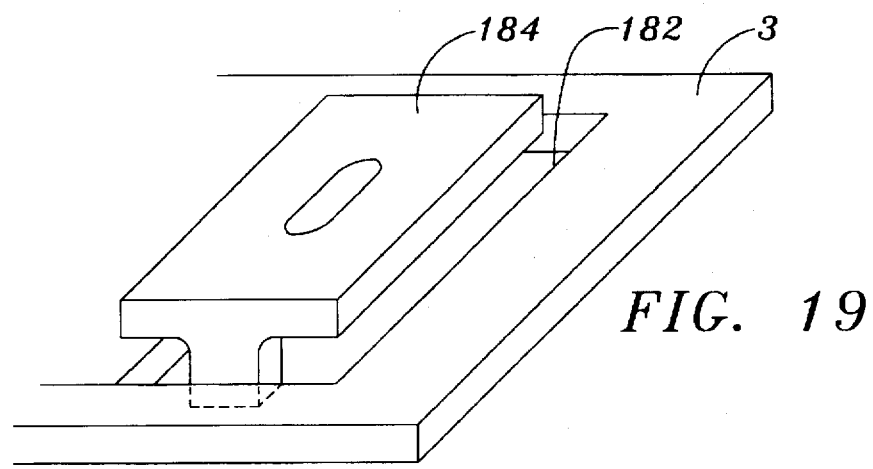
FIG. 19 is a diagrammatic view of the web in elevation in FIG. 18 with one of its associated application components.

Thus, in FIGS. 16 and 19, two springs 80, 180 are mounted concentrically inside the housing 82 of the web and the pair of apertures 81 opposite the guide components 4, 5.

As in FIG. 3, shoes 9 are provided for guiding the web laterally during its relative movement with respect to the guide components.

Figure 17:
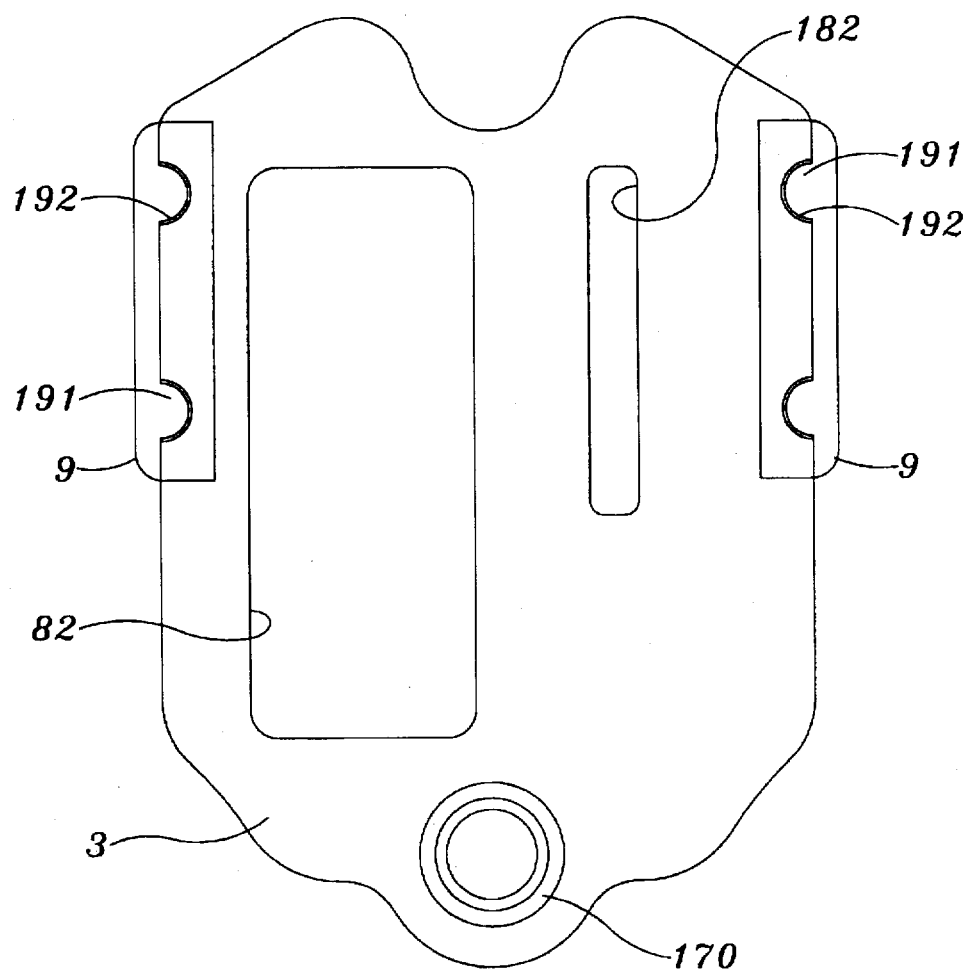
FIG. 17 is an elevation view of the web in FIG. 3.

At 191 in FIG. 17 the bosses on the said shoes 9 can be seen, cooperating with the complementary cutouts 92 provided in the web 3. The shoes 9 are less high than the web 3 and components 4, 5, as in FIGS. 2 and 3.

Here the bosses, like the cutouts 92, are semicircular in shape, and two bosses and therefore two recesses are provided per shoe.

In this way the connection of the mortice and tenon type is formed, the shoes being connected or coupled to the web 3 by cooperation of shapes.

These shoes are allowed to rub like a slide during the relative movement between the web 3 and guide components 4, 5, against the rims 90, 91 of the guide components 4, 5, the said rims having axially oriented portions for cooperation with the shoes 9.

As mentioned previously, these shoes form part of a friction device acting between the web 3 and guide components 4, 5, the said device itself forming part of the friction means according to the invention.

In these figures, the friction means include a second friction device which is elastically calibrated.

More precisely, in these FIGS. 16 and 17, the web 3 has a guide cutout 182 rectangular in shape and elongate, just like the aperture 82.

This cutout 182, constituting an aperture, extends parallel to the aperture 82, whilst being less wide and less high than the latter.

The guide components have dished areas 181 opposite the aperture 182.

These areas 181 project outwards and have a base parallel to the web 3 allowing fixing of the columns 183 connecting together the dishes 181 opposite each other.

The shaft of the column 183 therefore forms a brace between the two dished areas 181 and is allowed to enter the cutout 182 and to slide along the latter. The cutout 182 therefore guides the columns.

By virtue of this arrangement the guiding of the web 3 with respect to the guide components 4, 5 is improved and the columns participate in the connection of the guide components.

The shaft of the column serves for the mounting of the application and friction components 184 able to come into contact with the web 3 like a slide. These application components have centrally a tubular sleeve surrounding the shaft of the column 183. Here two application components 184 are mounted on each side of the web, each being subject to the action of an axially acting elastic washer 185, in this case a Belleville washer, or as a variant a wave washer.

Each washer 185 bears on the relevant application component and on the base of the dished area 181, whilst surrounding the tubular central area of the relevant application component 184.

Thus the application components 184 are pushed towards the web 3 by the elastic washers 185, the said washers 185 bearing on the base of the dishes 181 to press the application components 184 in contact with the web 3. These components 184 are movable, being guided by the columns by means of their central sleeve.

Thus, compared with the arrangement in FIG. 3, one of the housings 81 has been omitted in order to fit friction means acting between the web and the guide components.

Thus friction means are mounted within the cartridge. Advantageously the shoes 9 have a low coefficient of friction, but this depends on the application since the shoes participate in the friction.

Naturally it is possible to interpose friction washers between the application components, in this case metallic, and the web.

For example each application washer 184 can carry fixedly, for example by bonding, a friction lining for contact with the web 3.

The converse is possible, the web 3 then being covered on each of its faces with friction linings.

Thus the second friction device has at least one application component with a central sleeve guided by the columns and an axially acting elastic washer for calibrating the said friction in a controlled manner.

Naturally the columns 183 can be in two parts, namely an inner part forming rivets between the dishes 181 and an outer part consisting of a socket surrounding the said rivet and maintaining the axial separation between the dished areas 181.

The application components 184 are then guided by the said sockets.

Naturally the structures can be reversed.

Thus the application components 184, instead of rubbing against the web 3, can rub against the guide components 4, 5. These components 184 then have, at each end (FIGS. 18, 19), a lug coming into engagement with the relevant lateral edge of the cutout 182.

In this case the application components 184 cannot move radially or transversely with respect to the web, unlike the embodiment in FIGS. 16 and 17.

Figure 18:
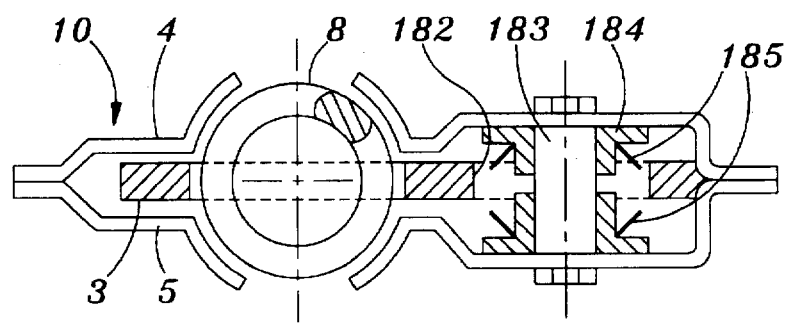
FIG. 18 is a view similar to FIG. 16 for yet another example embodiment.

In this case the components have an oblong opening for the shaft of the columns 183 to pass. The elastic washers 185 are interposed between the two application components in order to push them in contact with the guide components. They bear on each other at their external periphery and at their internal periphery on the relevant application component 184. The oblong opening is delimited by an oblong central sleeve engaged on the columns (FIG. 18). Thus the central sleeve allows radial movement of the column.

Naturally the dimension of the cutouts 182 (FIG. 17) or of the oblong opening (FIG. 19) formed in the application washer depends on the relative movement occurring between the web 3 and the guide components.

Naturally two friction devices with a cutout 182 can be disposed on each side of the elastic means 80, 180. In this case, the guide shoes can be omitted.

It is possible to produce all possible combinations.

The guide components 4, 5 of the cartridges can be fixed laterally to each other by means of columns.

Figure 20:
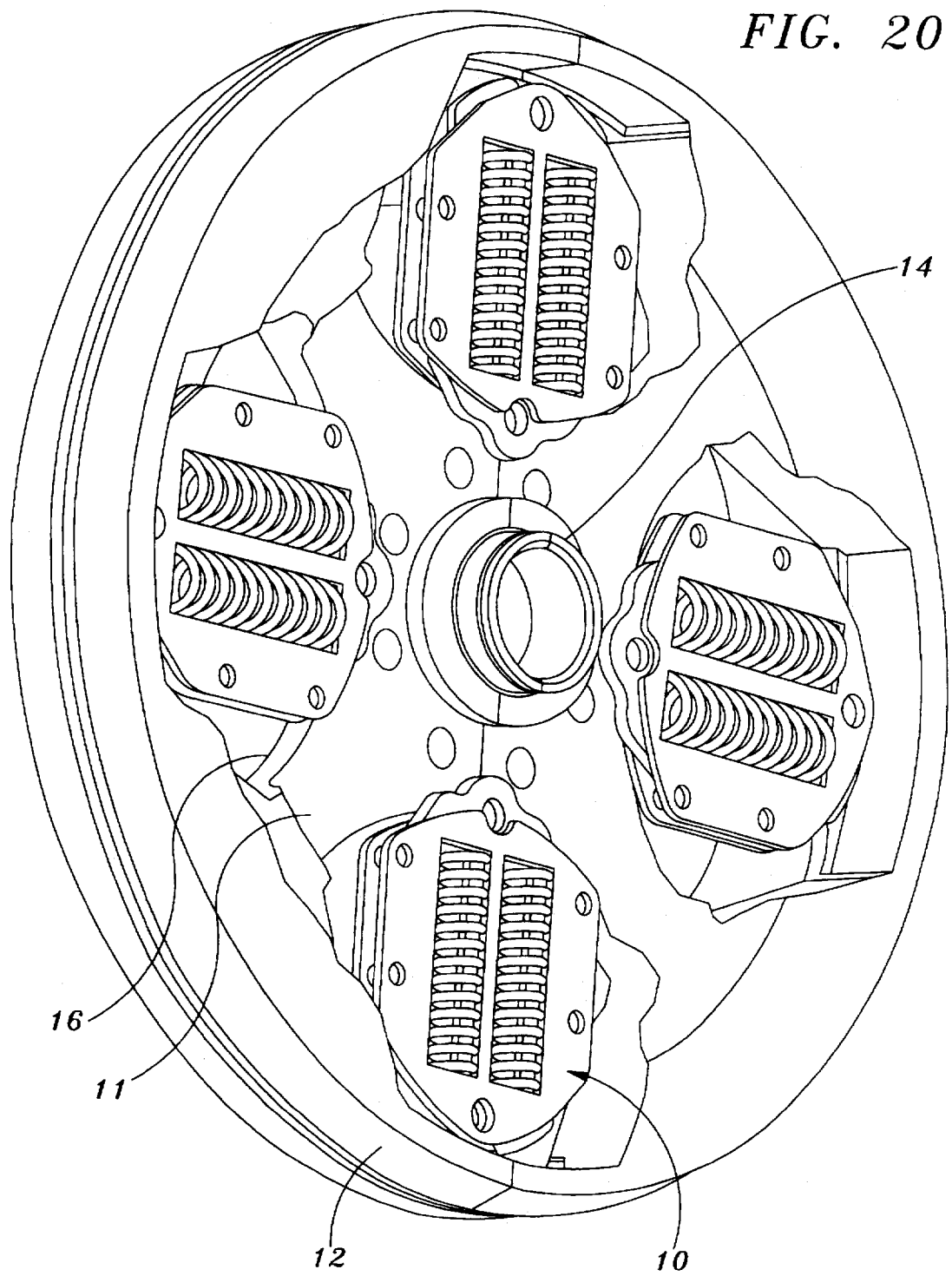
FIG. 20 is a perspective view without the second mass of a damping flywheel for yet another example embodiment, without the pivoting means.
Figure 21:
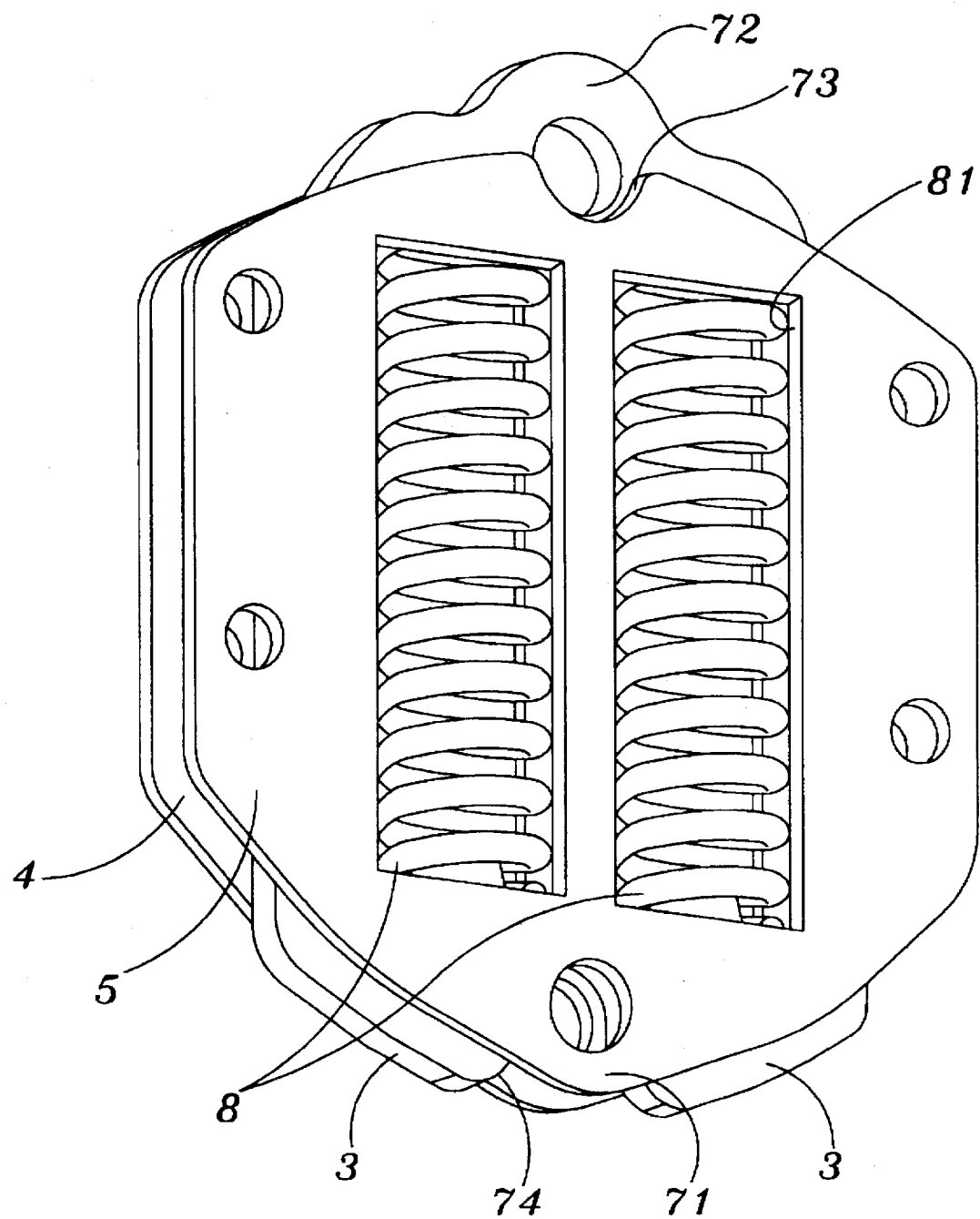
FIG. 21 is a perspective view of a cartridge of FIG. 20.

Thus the lateral edges of the guide components 4, 5 extend parallel to each other (FIGS. 20 and 21) and have holes for the columns to pass through.

In these figures the guide components 4, 5 are flat, having no lips.

Figure 22:
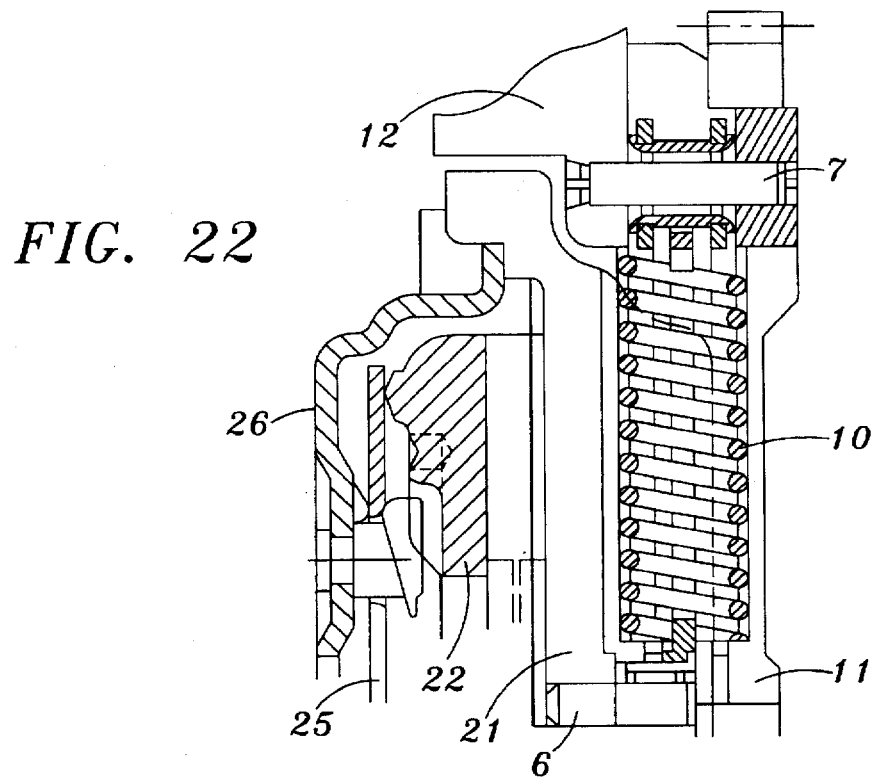
FIG. 22 is a partial View showing the second pivoting means for yet another example embodiment.

Naturally (FIG. 22) the skirt 12 can be attached to the reaction plate by means for example of rivets (not visible) on the plate 11, at the external periphery thereof, in order to carry the pivoting means. In this figure the cover 26 is conventional and has a radial fixing rim.

The structures can be reversed with regard to the guide shoes 9, the guide components having tenons in order to come into engagement in a complementary matter with cutouts formed in the shoes.

The relief recesses 73, 74 for the pivoting means 6, 7 can have a shape other than semicircular.

As will have been understood, in FIGS. 16 and 17, the application components 184 each have a central sleeve or socket by means of which they are slidably mounted on a tubular component 183, the shaft of which is mounted axially between the two guide components 4, 5.

This tubular component 183 passes through the web by means of an opening 182.

In the embodiment in FIGS. 19 and 18 the tubular component 183 also passes through the cutout 182 and the application components 184 are mounted in reverse orientations, their central sleeve, then oblong in shape, serving for the mounting of an axially acting elastic washer 185 and being guided by the columns 183.

In this case these elastic washers, in the form of a Belleville washer, bear on each other at their external periphery and are fitted by means of the said opening 182.

The friction means are mounted laterally with respect to the elastic member 8.

It will be noted that in FIG. 16 the guide components 4, 5 are dished to support the springs 180.

We claim:

1. Damping flywheel having two axial masses (1, 2) mounted so as to move with respect to each other, counter to an elastic damping device (10) having at least one elastic member (8) acting radially overall between said masses and pivotally mounted on each one thereof, wherein said elastic member (8) is mounted in a pivoted cartridge (10) having a web (3) provided with a first housing (82) for mounting said elastic member (8) and two guide components (4, 5) disposed axially on each side of the web (3) and each having, opposite the first housing (82), a second housing (81) for mounting said elastic member (8), wherein the guide components (4, 5) are fixed to each other, wherein the web (3) and the guide components (4, 5) are mounted in reverse orientations, said web (3) having at one of its internal and external peripheries a first protuberance (72) for mounting first pivoting means on a first (2) of said masses, while the guide components (4, 5) each have at one of their external and internal peripheries a second protuberance (71), opposite each other, for mounting second pivoting means (7) on a second (1) of said masses, said second protuberances (71) and first protuberances (70) being radially offset with respect to each other, and wherein friction means (9–181, 183, 184, 185) are mounted within the cartridge (10) for action between the web (3) and the guide components (4, 5).

2. Flywheel according to claim 1, wherein the friction means include a friction device provided with friction shoes (9) acting laterally between the guide components (4, 5) and the web (3).

3. Flywheel according to claim 2, wherein one of the shoes (9) and web (3) has a tenon, whilst the other one of the web (3) and shoes (9) has a mortice for connecting the shoe (9) to the web (3) by cooperation of shapes.

4. Flywheel according to claim 2, wherein the shoes (9) are allowed to rub against rims (90, 91) which the guide components (4, 5) have laterally, for mutual fixing.

5. Flywheel according to claim 1, wherein the friction means include two application components (184) disposed on each side of the web (3) and each having a central sleeve by means of which two application components (184) are slidably mounted on a tubular member, a shaft of which is mounted axially between the two guide components (4, 5).

6. Flywheel according to claim 5, wherein each application component (184) is subject to the action of an axially acting elastic washer (185) bearing on one of the guide components (4, 5) for pushing the application components (184) in the direction of the web (3).

7. Flywheel according to claim 1, wherein the friction means include two application components (184) with an oblong central sleeve for mounting an axially acting elastic washer (185), and wherein the two application components (184) with the associated elastic washers (185) are mounted in reverse orientations by means of an opening formed in the web (3).

8. Flywheel according to claim 1, wherein the friction means are mounted laterally with respect to the elastic member (8).

9. Flywheel according to claim 1, wherein one of the masses (1, 2), referred to as the first mass, is suitable for being connected to a crankshaft, whilst the other mass (2) forms the reaction plate (21) of a clutch while being rotatably mounted on the first mass (1) by means of a bearing (15).

* * * * *